US011588387B2

(12) United States Patent
Mahajan et al.

(10) Patent No.: US 11,588,387 B2
(45) Date of Patent: Feb. 21, 2023

(54) HYBRID SPHERICAL MOTOR, SYSTEM, AND AERIAL VEHICLE INCORPORATING THE SAME

(71) Applicant: HONEYWELL INTERNATIONAL INC., Morris Plains, NJ (US)

(72) Inventors: Deepak Pitambar Mahajan, Bangalore (IN); Varun Ananda, Bangalore (IN); Subhashree Rajagopal, Bangalore (IN); Renukaprasad N, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 377 days.

(21) Appl. No.: 16/999,539

(22) Filed: Aug. 21, 2020

(65) Prior Publication Data

US 2022/0014085 A1    Jan. 13, 2022

(30) Foreign Application Priority Data

Jul. 8, 2020    (IN) .............................. 202011029001

(51) Int. Cl.
| | |
|---|---|
| *H02K 41/06* | (2006.01) |
| *B64C 39/02* | (2023.01) |
| *B64D 27/24* | (2006.01) |
| *H02K 7/116* | (2006.01) |

(52) U.S. Cl.
CPC ......... *H02K 41/065* (2013.01); *B64C 39/024* (2013.01); *B64D 27/24* (2013.01); *H02K 7/116* (2013.01); *B64C 2201/027* (2013.01); *B64C 2201/042* (2013.01); *B64C 2201/108* (2013.01)

(58) Field of Classification Search
CPC . H02K 41/06–41/065; B64C 2201/042; B64C 2201/108
See application file for complete search history.

(56) References Cited

U.S. PATENT DOCUMENTS

| | | | |
|---|---|---|---|
| 7,675,208 | B2 | 3/2010 | Bandera |
| 8,080,911 | B2 | 12/2011 | Won et al. |
| 10,110,108 | B2 | 10/2018 | Bandera |
| 10,326,348 | B2 | 6/2019 | Bandera et al. |
| 2020/0096844 | A1 | 3/2020 | Liao et al. |

*Primary Examiner* — Ramon M Barrera
(74) *Attorney, Agent, or Firm* — Lorenz & Kopf, LLP (57) ABSTRACT

A hybrid spherical motor includes a first gear box, a second gear box, a yoke arm, a brushless direct current (BLDC) motor, a spherical stator, and a spherical armature. The split armature, in response to the spherical stator being energized, rotates about a first rotational axis, thereby causing the first gear box input connection and the second gear box input connection to rotate about the first rotational axis, and the yoke arm rotates about the first rotational axis in response to the first gear box input connection and the second gear box input connection being rotated about the first rotational axis, whereby the BLDC motor rotates about the first rotational axis.

20 Claims, 11 Drawing Sheets

HYBRID SPHERICAL MOTOR, SYSTEM, AND AERIAL VEHICLE INCORPORATING THE SAME

CROSS REFERENCE TO RELATED APPLICATION

The present application claims the benefit of prior filed Indian Provisional Patent Application No. 202011029001, filed Jul. 8, 2020, which is hereby incorporated by reference herein in its entirety.

TECHNICAL FIELD

The present disclosure generally relates to multi degree-of-freedom motors, and more particularly relates to a hybrid spherical motor that includes gear boxes to enhance torque in one axis of rotation, and to systems and aerial vehicles that incorporate the same.

BACKGROUND

Recent developments in the field of UAV (Unmanned Aerial Vehicles), drones for unmanned air transport, robotics, office automation, and intelligent flexible manufacturing and assembly systems have necessitated the development of precision actuation systems with multiple degrees of freedom (DOF). Conventionally, applications that rely on multiple (DOF) motion have typically done so by using a separate motor/actuator for each axis, which results in complicated transmission systems and relatively heavy structures.

With the advent of spherical motors, there have been multiple attempts to replace the complicated multi-DOF assembly with a single spherical motor assembly. A typical spherical motor consists of a central sphere on which coils are wound, which may be orthogonally placed from each other. The sphere is surrounded by multi-pole magnets in the form of an open cylinder. The coil assembly is held axially and maintained in a vertical position via, for example, a metal post. The outer cylinder is held by a yoke/frame via a bearing, which allows the cylinder to be rotatable about its axis. The yoke is further connected to the metal post of the coil assembly via a second bearing, which allows the yoke, along with the cylinder, to be rotatable about one or two additional axes.

Unfortunately, current attempts to apply the spherical motor to the certain applications, such as UAVs and robotics, have led to several spherical motor design concepts. Unfortunately, many of these design concepts suffer certain drawbacks. For example, many exhibit relatively limited torque and precise positioning, especially in the tilt axis.

Hence, there is a need for a multi-degree-of-freedom electromagnetic machine that at least exhibits improved generated torque and position precision—especially in the tilt axis. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a hybrid spherical motor includes a first gear box, a second gear box, a yoke arm, a brushless direct current (BLDC) motor, a spherical stator, and a spherical armature. The first gear box is mounted against rotation and includes a first gear box input connection and a first gear box output connection. The first gear box input connection is rotatable about a first rotational axis. The second gear box is coupled to, and is spaced apart from, the first gear box. The second gear box has a second gear box input connection and a second gear box output connection. The second gear box input connection is rotatable about the first rotational axis. The yoke arm has a first end and a second end. The first end is coupled to the first gear box output connection, and the second end is coupled to the second gear box output connection. The BLDC motor is mounted on the yoke arm and includes a BLDC stator and a BLDC rotor. The BLDC stator is fixedly coupled to the yoke arm. The BLDC rotor is rotationally coupled to the yoke arm and is configured, in response to the BLDC stator being energized, to rotate about a second rotational axis that is perpendicular to the first rotational axis. The spherical stator has a plurality of stator windings wound thereon, and is fixedly coupled to the yoke arm and surrounds at least a portion of the BLDC motor. The split armature is spaced apart from, and surrounds a portion of, the spherical stator, and includes a first armature arm and a second armature arm. The first armature arm is coupled to the first gear box input connection and is rotatable therewith about the first rotational axis. The second armature arm is coupled to the second gear box input connection and is rotatable therewith about the first rotational axis. The split armature, in response to the plurality of stator windings being energized, rotates about the first rotational axis, thereby causing the first gear box input connection and the second gear box input connection to rotate about the first rotational axis, and the yoke arm rotates about the first rotational axis in response to the first gear box input connection and the second gear box input connection being rotated about the first rotational axis, whereby the BLDC motor rotates about the first rotational axis.

In another embodiment, a hybrid spherical motor includes a first gear box, a second gear box, a yoke arm, a brushless direct current (BLDC) motor, a spherical stator, a spherical armature, and a controller. The first gear box is mounted against rotation and includes a first gear box input connection and a first gear box output connection. The first gear box input connection is rotatable about a first rotational axis. The second gear box is coupled to, and is spaced apart from, the first gear box. The second gear box has a second gear box input connection and a second gear box output connection. The second gear box input connection is rotatable about the first rotational axis. The yoke arm has a first end and a second end. The first end is coupled to the first gear box output connection, and the second end is coupled to the second gear box output connection. The BLDC motor is mounted on the yoke arm and includes a BLDC stator and a BLDC rotor. The BLDC stator is fixedly coupled to the yoke arm. The BLDC rotor is rotationally coupled to the yoke arm and is configured, in response to the BLDC stator being energized, to rotate about a second rotational axis that is perpendicular to the first rotational axis. The spherical stator has a plurality of stator windings wound thereon, and is fixedly coupled to the yoke arm and surrounds at least a portion of the BLDC motor. The split armature is spaced apart from, and surrounds a portion of, the spherical stator, and includes a first armature arm and a second armature arm. The first armature arm is coupled to the first gear box input connection and is rotatable therewith about the first rotational axis. The second armature arm is coupled to the second gear box input connection and is rotatable therewith about the first rotational axis. The controller is coupled to, and is configured to selectively and independently energize, the BLDC motor stator and the plurality of stator windings. The split armature, in response to the plurality of stator windings being energized, rotates about the first rotational axis, thereby causing the first gear box input connection and the second gear box input connection to rotate about the first rotational axis, and the yoke arm rotates about the first rotational axis in response to the first gear box input connection and the second gear box input connection being rotated about the first rotational axis, whereby the BLDC motor rotates about the first rotational axis.

In yet another embodiment, an unmanned aerial vehicle (UAV) includes an airframe, a plurality of propellers rotatable relative to the airframe, and a plurality of hybrid spherical motors mounted on the airframe. Each hybrid spherical motor is coupled to a different one of the propellers, and each includes a first gear box, a second gear box, a yoke arm, a brushless direct current (BLDC) motor, a spherical stator, and a spherical armature. The first gear box is mounted against rotation and includes a first gear box input connection and a first gear box output connection. The first gear box input connection is rotatable about a first rotational axis. The second gear box is coupled to, and is spaced apart from, the first gear box. The second gear box has a second gear box input connection and a second gear box output connection. The second gear box input connection is rotatable about the first rotational axis. The yoke arm has a first end and a second end. The first end is coupled to the first gear box output connection, and the second end is coupled to the second gear box output connection. The BLDC motor is mounted on the yoke arm and includes a BLDC stator and a BLDC rotor. The BLDC stator is fixedly coupled to the yoke arm. The BLDC rotor is rotationally coupled to the yoke arm and is configured, in response to the BLDC stator being energized, to rotate about a second rotational axis that is perpendicular to the first rotational axis. The spherical stator has a plurality of stator windings wound thereon, and is fixedly coupled to the yoke arm and surrounds at least a portion of the BLDC motor. The split armature is spaced apart from, and surrounds a portion of, the spherical stator, and includes a first armature arm and a second armature arm. The first armature arm is coupled to the first gear box input connection and is rotatable therewith about the first rotational axis. The second armature arm is coupled to the second gear box input connection and is rotatable therewith about the first rotational axis. The split armature, in response to the plurality of stator windings being energized, rotates about the first rotational axis, thereby causing the first gear box input connection and the second gear box input connection to rotate about the first rotational axis, and the yoke arm rotates about the first rotational axis in response to the first gear box input connection and the second gear box input connection being rotated about the first rotational axis, whereby the BLDC motor rotates about the first rotational axis.

Furthermore, other desirable features and characteristics of the motor, system, and aerial vehicle will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
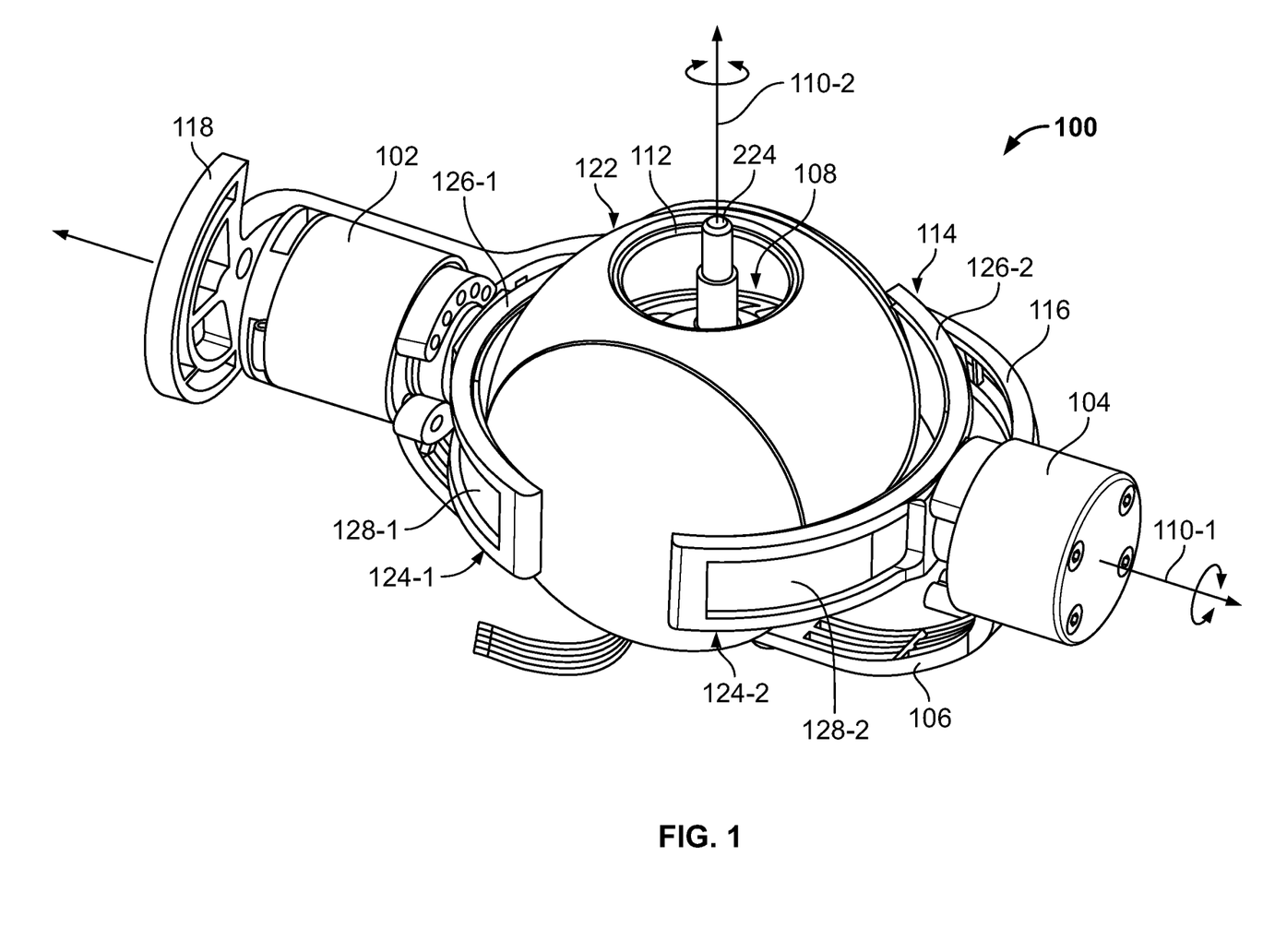
FIG. 1 depicts a plan view of one embodiment of a hybrid spherical motor.
Figure 2:
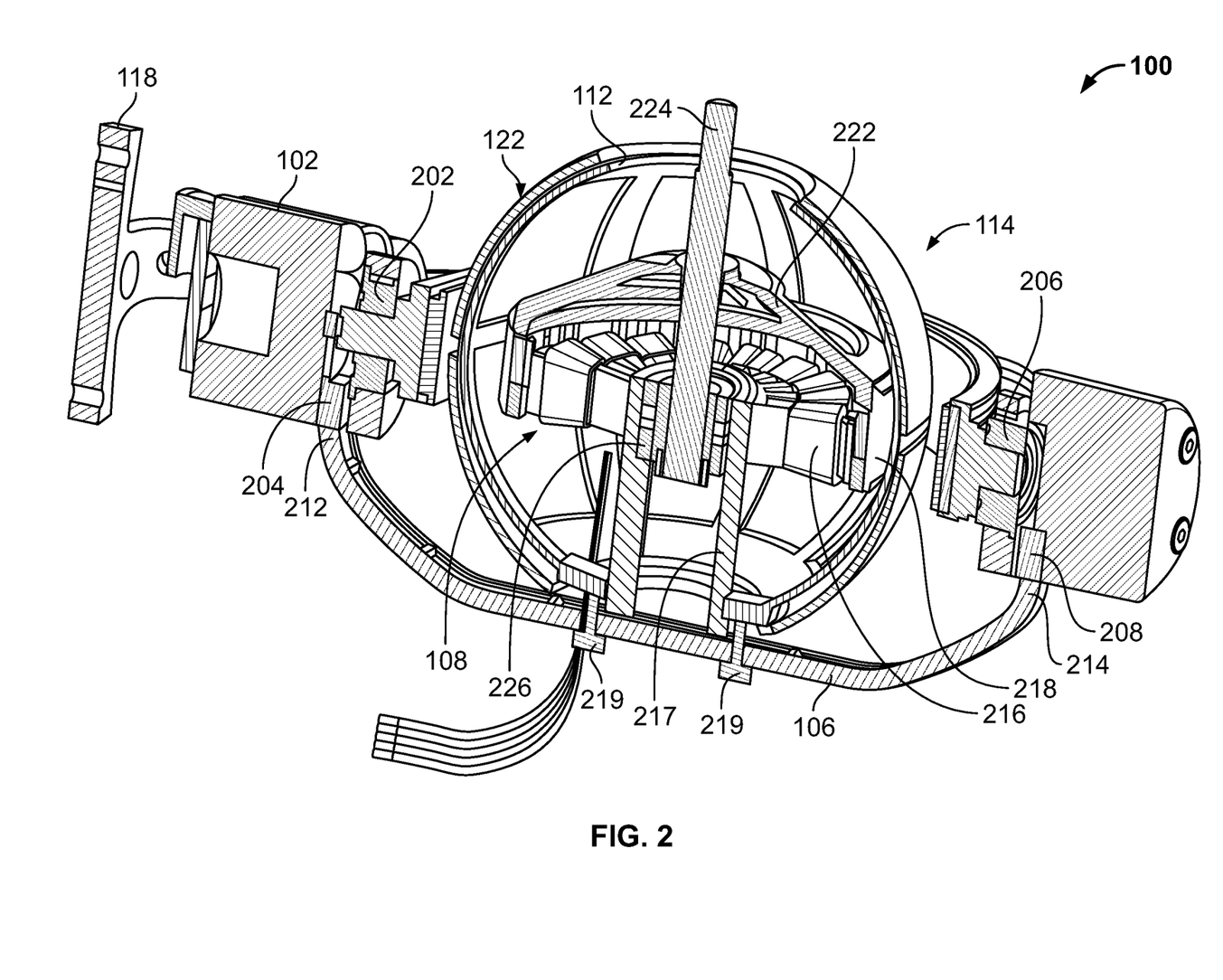
FIG. 2 depicts a cross section plan view of the hybrid spherical motor of FIG. 1.

Referring to FIGS. 1 and 2, a hybrid spherical motor 100 is depicted and includes a first gear box 102, a second gear box 104, a yoke arm 106, a brushless direct current (BLDC) motor 108, a spherical stator 112, and a split armature 114. The first gear box 102 is mounted against rotation and, as shown in FIG. 2, includes a first gear box input connection 202 and first gear box output connection 204. As will be described further below, the first gear box input connection 202 is rotatable about a first rotational axis 110-1.

The second gear box 104 is coupled to, and is spaced apart from, the first gear box 102. Thus, the second gear box 104 is also mounted against rotation. In particular, at least in the depicted embodiment, the first and second gear boxes 102, 104 are both coupled to a mount frame 116, which is in turn fixedly coupled to a structure 118, such as an airframe of an unmanned aerial vehicle (discussed further below). The second gear box 104 has a second gear box input connection 206 and second gear box output connection 208, and the second gear box input connection 206 is also rotatable about the first rotational axis 110-1.

The first and second gear boxes 102, 104 each exhibit a gear ratio between its input connection and its output connection. That is, the first gear box 102 exhibits a first gear ratio between the first gear box input connection 202 and the first gear box output connection 204, and the second gear box 104 exhibits a second gear ratio between the second gear box input connection 206 and the second gear box output connection 208. As may be appreciated, the first gear ratio and the second gear ratio are equal. As may also be appreciated, the first and second gear ratios may vary. For example, the first and second gear ratios may vary from 4:1 up to 1024:1. In one particular embodiment, however, a gear ratio of 256:1 is selected.

It will also be appreciated that the first and second gear boxes 102, 104 may be variously configured and implemented. That is, each may be implemented using any one of numerous types of gear arrangements including, without limitation, spur gears, helical gears, bevel gears, worm gears, and rack-and-pinion gears, just to name a few. In one particular embodiment, the first and second gear boxes 102, 104 are implemented using planetary gears.

Regardless of the specific gear ratio, the yoke arm 106 is coupled to the first and second output connections 204, 208. More specifically, the yoke arm 106 has a first end 212, which is coupled to the first gear box output connection 204, and a second end 214, which is coupled to the second gear box output connection 208. The yoke arm 106 may thus be thought of as a common shaft between the first and second gear boxes 102, 104.

The BLDC motor 108 is mounted on the yoke arm 106. The BLDC motor 108 is implemented using a convention BLDC motor configuration, and thus includes a BLDC stator 216 and a BLDC rotor 218. The BLDC stator 216 is fixedly coupled to the yoke arm 106, via a support tube 217 and mounting hardware 219. The BLDC rotor 218 is rotationally coupled to the yoke arm 106 and is configured, in response to the BLDC stator being energized, to rotate about a second rotational axis 110-2 that is perpendicular to the first rotational axis 110-1. More specifically, the BLDC rotor 218 is fixedly coupled, via an attachment structure 222, to an output shaft 224. The output shaft 224 is in turn rotationally mounted, via suitable bearing hardware 226, to the support tube 217. Thus, when the BLDC rotor 218 rotates, so too does the attachment structure 222 and output shaft 224.

Figure 3:
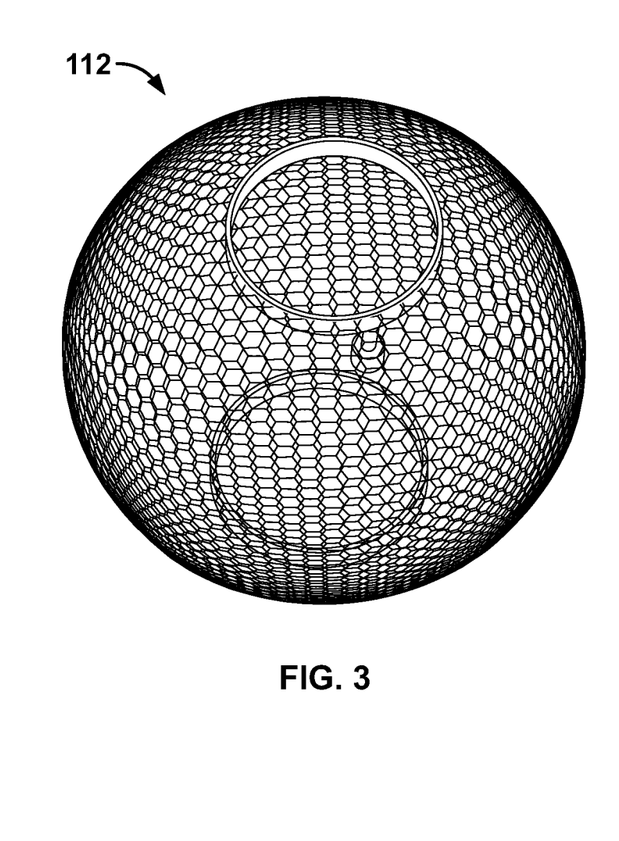
FIGS. 3 and 4 depict alternative embodiments of a spherical stator that may be used to implement the hybrid spherical motor of FIG. 1.
Figure 4:
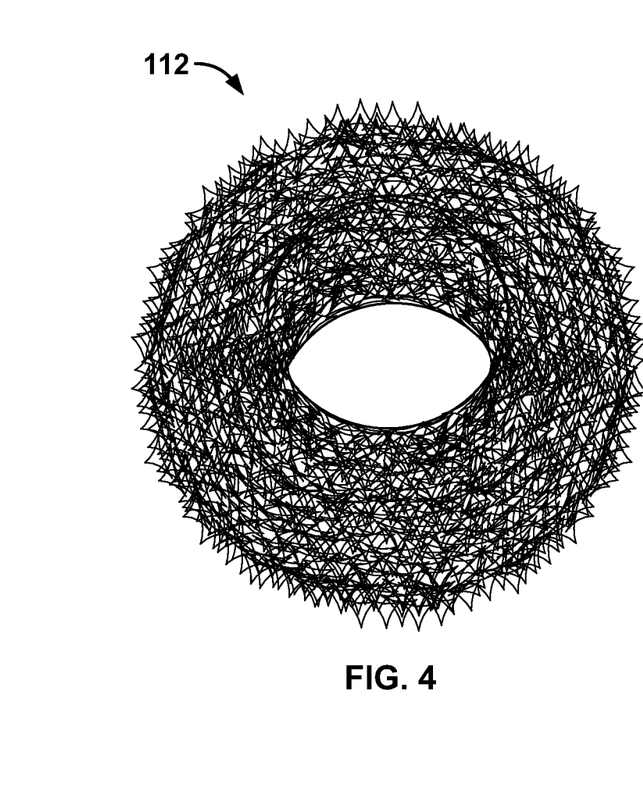

The spherical stator 112 has a plurality of stator windings 122 wound thereon. The configuration of the stator windings 122 will be discussed further below. The spherical stator 112 is fixedly coupled, via the mounting hardware 219, to the yoke arm 106 and surrounds at least a portion of the BLDC motor 108. In the depicted embodiment, the spherical stator 112 surrounds the entirety of the BLDC motor 108. The spherical stator 112 may be variously configured and implemented. For example, it may be configured and implemented as a hollow sphere structure with openings in the top and bottom, as a spherically shaped ribbed structure with openings in the top and bottom (see FIG. 2), or as a spherically shaped lattice structure (FIG. 3). It will also be appreciated that it may be made of various materials, such as steel, plastic or, as depicted in FIG. 4, metal foam.

Figure 5:
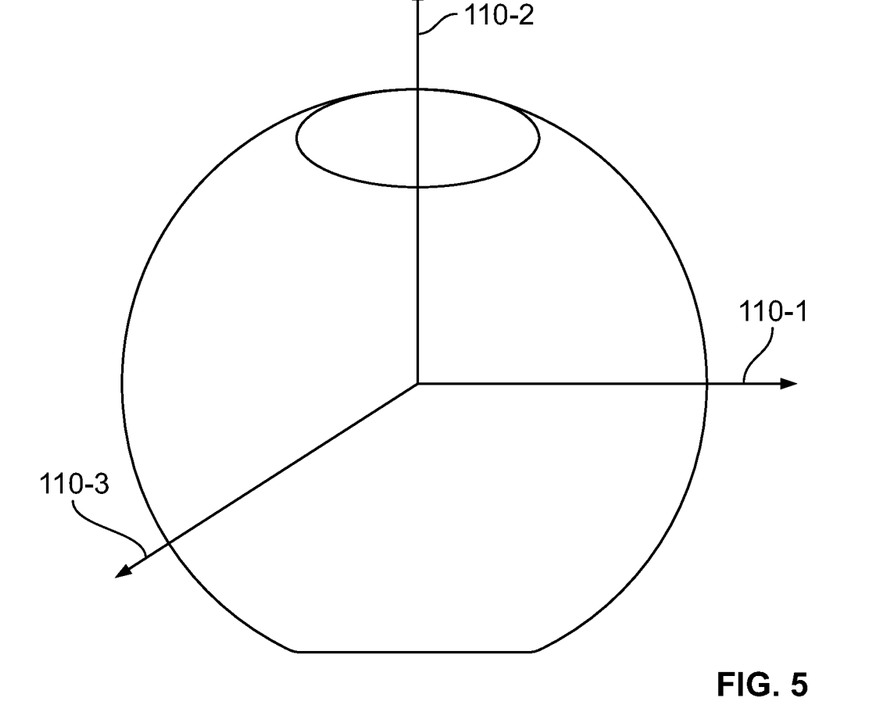
FIG. 5 depicts a simplified schematic representation of a spherical stator and associated axes of symmetry.

Regardless of its particular configuration and material makeup, and as FIG. 5 depicts, the spherical stator 112 is symmetrically disposed about three axes of symmetry. Specifically, it is symmetrically disposed about the first rotational axis 110-1, the second rotational axis 110-2, and a non-rotational axis 110-3.

The split armature 114 is spaced apart from, and surrounds a portion of, the spherical stator 112. The split armature 114 includes a first armature arm 124-1 and a second armature arm 124-2. The first armature arm 124-1 is coupled to the first gear box input connection and is rotatable therewith about the first rotational axis 110-1. The second armature arm 124-2 is coupled to the second gear box input connection and is rotatable therewith also about the first rotational axis 110-1. The split armature 114 may be variously configured, but in the depicted embodiment each armature arm 124 comprises an arc-shaped support and one or more magnets. Although the one or more magnets may be variously implemented, in the depicted embodiment each is implemented as a Halbach array. Thus, at least in the depicted embodiment, the first armature arm 124-1 comprises a first arc-shaped support 126-1 and a first Halbach array 128-1 that is coupled to the first arc-shaped support 126-1. Similarly, the second armature arm 124-2 comprises a second arc-shaped support 126-2 and a second Halbach array 128-2 that is coupled to the second arc-shaped support.

Figure 6:
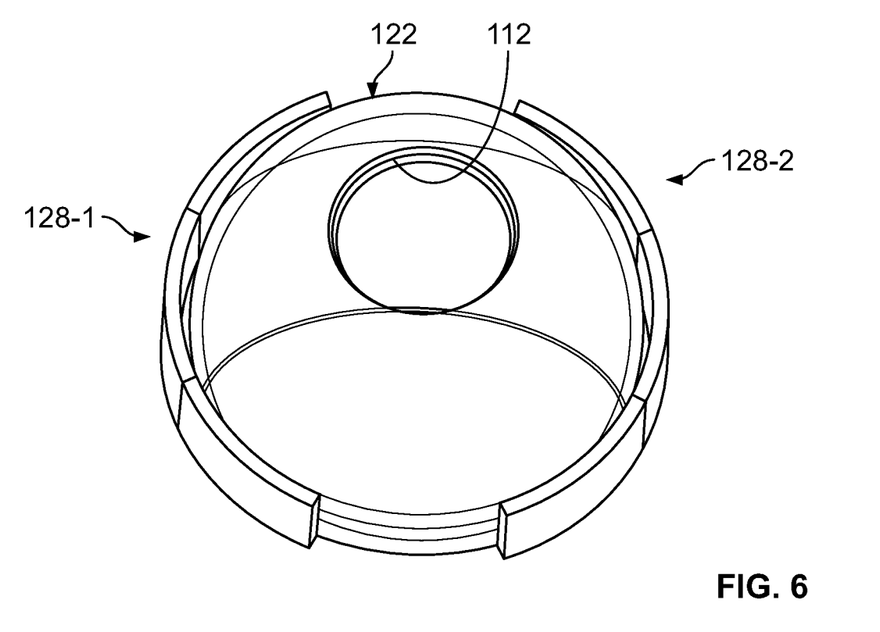
FIG. 6 depicts a plan view of a portion of the hybrid spherical motor showing a configuration of Halbach arrays that may comprise the split armature.
Figure 7A:
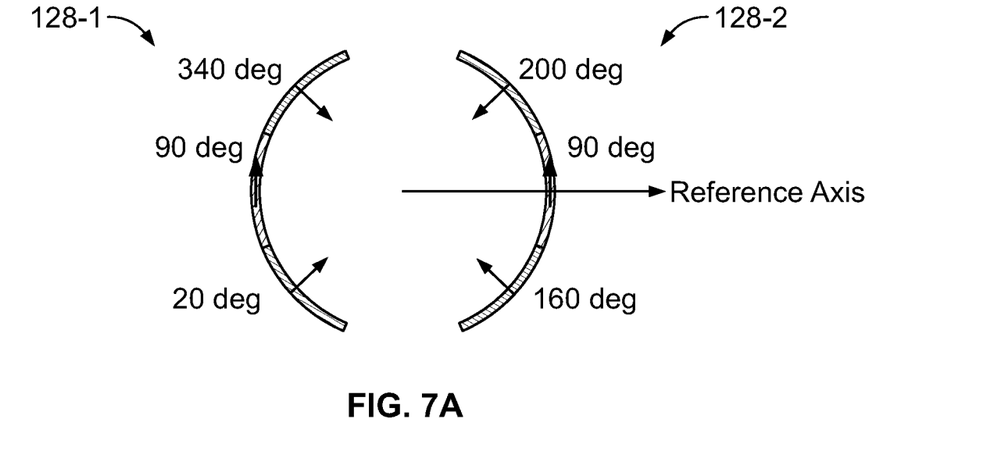
FIGS. 7A and 7B each depict examples of the magnetic orientation of the Halbach arrays depicted in FIG. 6.
Figure 7B:
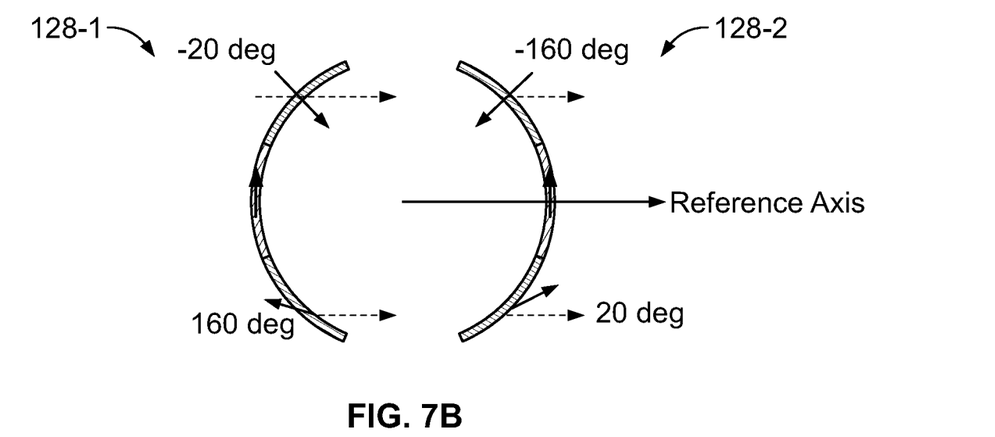

It will be appreciated that the arc length of the first and second armature supports 126 may vary. It will additionally be appreciated that the number of magnets that comprise the first and second Halbach arrays 128 may vary. In the depicted embodiment, the arc length of the first and second armature supports 126 is 135-degrees, and the first and second Halbach arrays 128 each comprise three arc-shaped magnets. As shown more clearly in FIG. 6, each arc-shaped magnet thus has a 45-degree arc length. Moreover, one example magnetic orientation of this embodiment is depicted in FIG. 7A, and another example magnetic orientation is depicted in FIG. 7B. It will be appreciated, however, that the magnetic orientations are not limited to the those shown in the embodiments.

Figure 8:
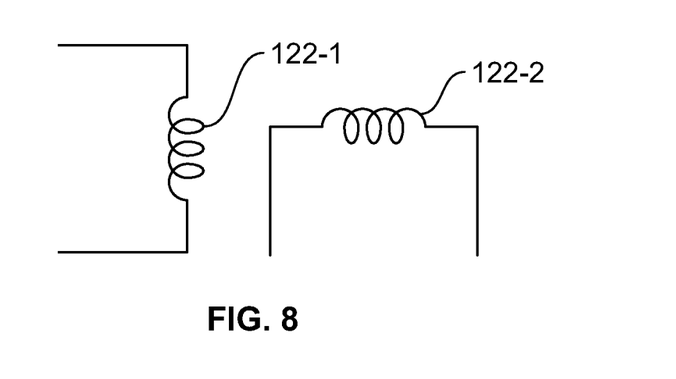
FIG. 8 schematically represents the stator windings that may be wound on the spherical stator.

Turning now to the stator windings 122, and with reference to FIG. 8, it is seen that the plurality stator windings 122 comprises a pair of windings—a first stator winding 122-1 and a second stator winding 122-2. As FIG. 8 also depicts, the first and second stator windings 122-1, 122-2 are configured to be independently energized. As may be appreciated, when the stator windings 122 are energized with predetermined pulse width modulated (PWM) bi-directional voltages, a Lorentz force is generated between the stator windings 122 and the first and second Halbach arrays 128, which in turn imparts a torque to the split armature 112, causing it to rotate about the first rotational axis 110-1 (e.g., tilt axis). This, in turn, causes the first and second gear box input connections 202, 206 to rotate about the first rotational axis 110-1. Because the yoke arm 106 is coupled to the first and second gear box output connections 204, 208, the yoke arm 106 also rotates about the first rotational axis 110-1. In addition, because the BLDC stator 216 is fixedly coupled to the yoke arm 106, the BLDC motor 108 rotates, with the yoke arm 106, about the first rotational axis 110-1.

Before proceeding further, it will be appreciated that the rotational direction and speed of rotation of the split armature 112 may be controlled by controlling the polarity and magnitude of the DC supplied to the first and second stator windings 122-1, 122-2. Moreover, the speed at which the yoke arm 106 rotates, in response to the rotation of the split armature 112, will depend on the first and second gear ratios.

As noted above, in one particular embodiment, the first and second gear ratios are 256:1, which means the yoke arm 106 (and thus the BLDC motor 108) will rotate at a much lower rotational speed than the split armature 112.

Figure 9:
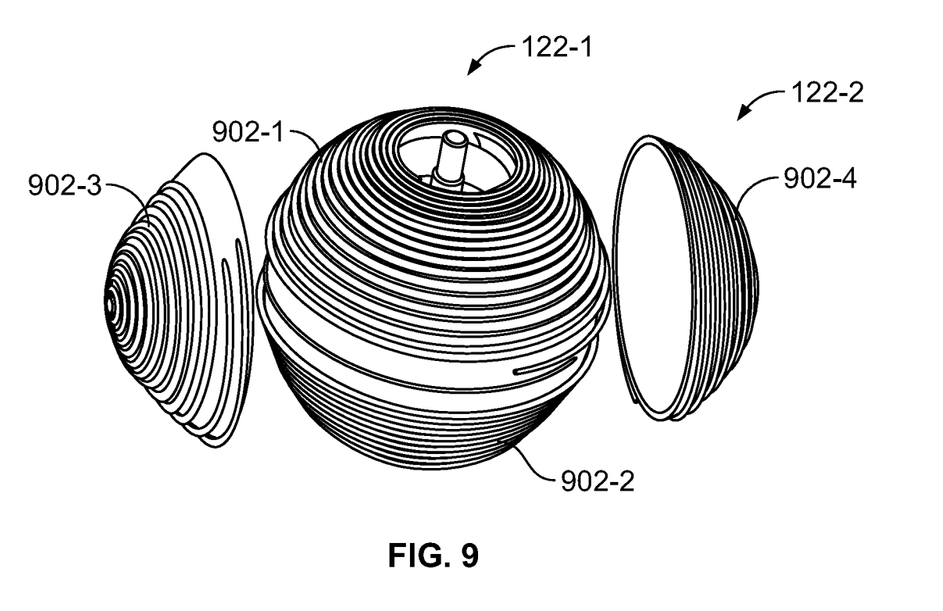
FIG. 9 depicts an exploded view of a portion of the hybrid motor, illustrating one embodiment of how the stator windings may be implemented.
Figure 10:
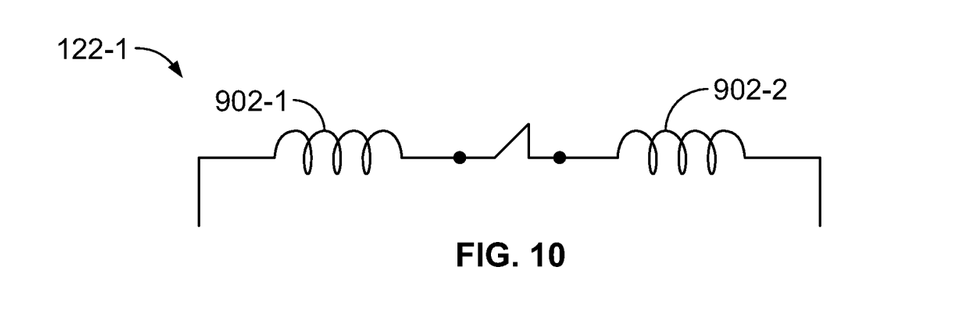
FIGS. 10 and 11 schematically depict the stator windings illustrated in FIG. 9.
Figure 11:
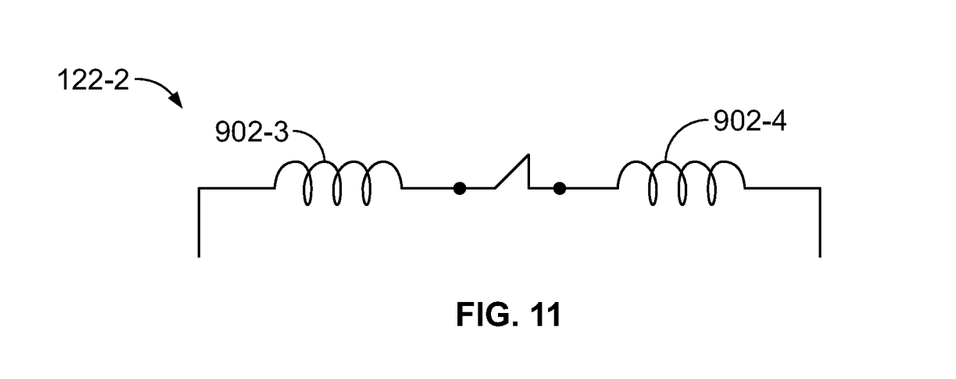

The configuration and implementation of the stator windings 122 may also vary. That is, the first and second stator windings 122-1, 122-2 may each comprise single or multiple coils. For example, in the embodiment depicted in FIG. 9, the first and second stator windings 122-1, 122-2 each comprise two coils. More specifically, the first stator winding 122-1 comprises a first coil 902-1 and a second coil 902-2, and the second stator winding 122-2 comprises a third coil 902-3 and a fourth coil 902-4. The first and second coils 902-1, 902-2 are electrically connected in series, as depicted in FIG. 10, and the third and fourth coils 902-3, 902-4 are also electrically connected in series, as depicted in FIG. 11.

Figure 12:
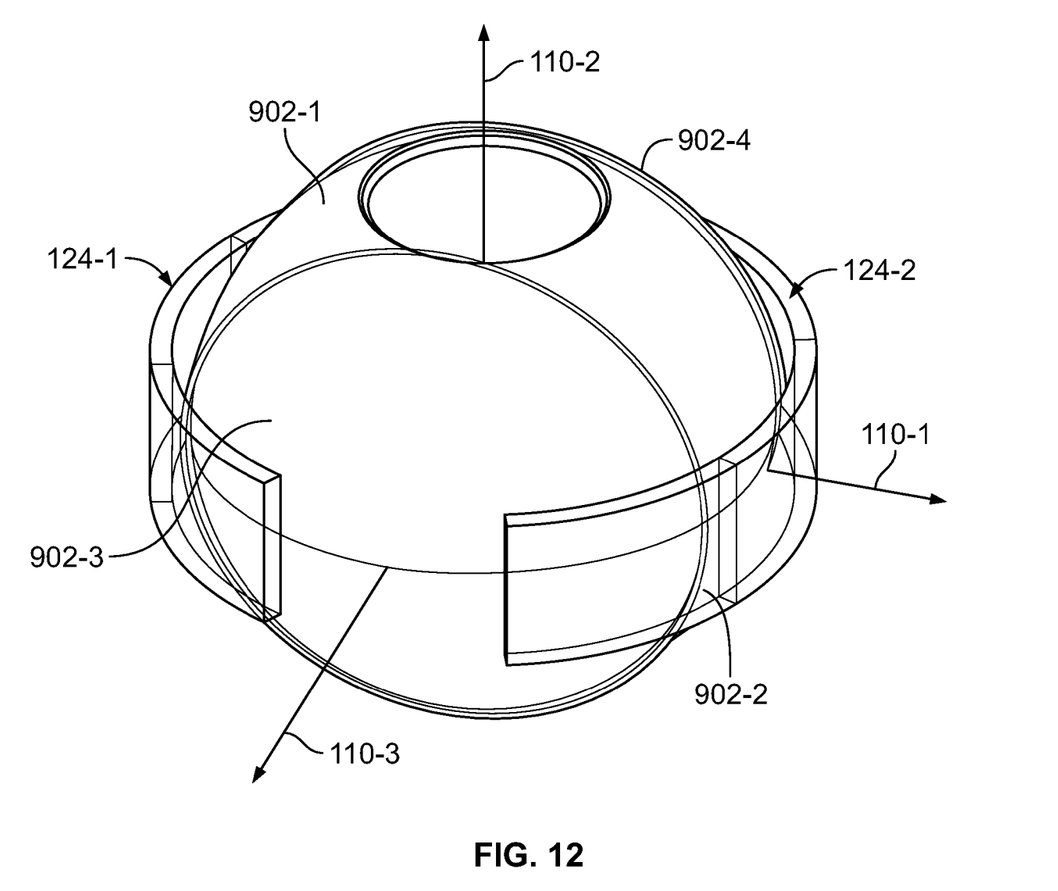
FIG. 12 depicts a plan view of a portion of the hybrid spherical motor showing how the stator windings of FIG. 11 may be wound, in one embodiment, on the spherical stator.

Referring now to FIG. 12, it was previously noted that the spherical stator 112 is symmetrically disposed about the first rotational axis 110-1, the second rotational axis 110-2, and a non-rotational axis 110-3. As FIG. 12 depicts, for the above-described embodiment, in which the first and second stator windings 122-1, 122-2 each comprise two coils, the first and second coils 902-1, 902-2 are each wound symmetrically about the second rotational axis 110-2, and the third and fourth coils 902-3, 902-4 are each wound symmetrically about the non-rotational axis 110-3.

Figure 13:
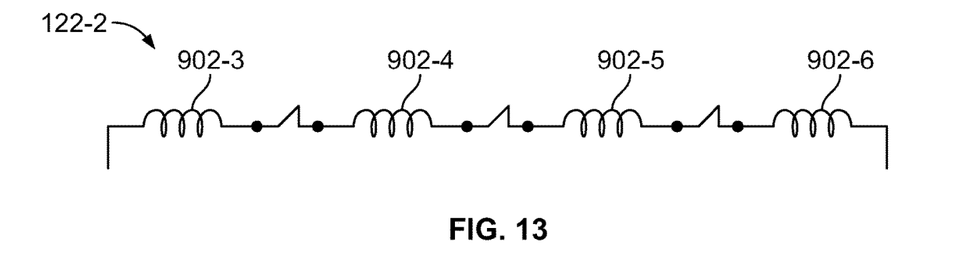
FIG. 13 schematically depicts one set of stator windings of another embodiment.
Figure 14:
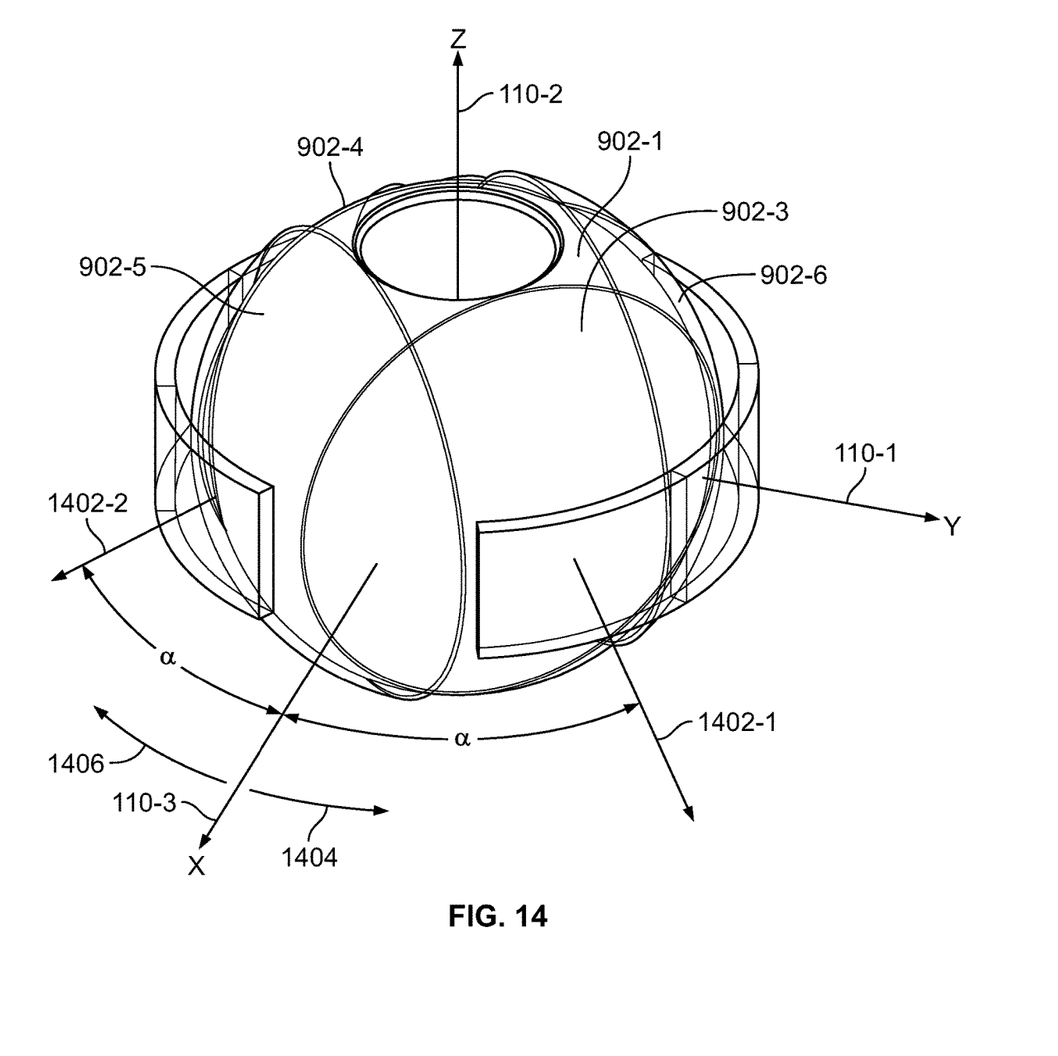
FIG. 14 depicts a plan view of a portion of the hybrid spherical motor showing how the stator windings of FIG. 13 may be wound, in one embodiment, on the spherical stator.

In other embodiments, while the first stator winding 122-1 continues to include two coils, the second stator winding 122-2 may comprise more than two coils. For example, in the embodiment depicted in FIG. 13, the second stator coil 122-2 includes four coils—a third coil 902-3, a fourth coil 902-4, a fifth coil 902-5, and a sixth coil 902-6, which are electrically connected in series. In this embodiment, the first and second coils 902-1, 902-2 are again each wound symmetrically about the second rotational axis 110-2. However, as shown more clearly in FIG. 14, the third and fourth coils 902-3, 902-4 are each wound symmetrically about a first coil axis 1402-1, and the fifth and sixth coils 902-5, 902-6 are each wound symmetrically about a second coil axis 1402-2. The first coil and second coil axes 1402-1, 1402-2 are both disposed perpendicular to the second rotational axis 110-2, and are both coplanar with the first rotational axis 110-1 and the non-rotational axis 110-3. However, the first coil axis 1402-1 is disposed at a predetermined angle (a), in a first rotational direction 1404, from the non-rotational axis 110-3, and the second coil axis 1402-2 is disposed at the same predetermined angle (a), but in a second rotational direction 1406 that is opposite the first rotational direction 1404, from the non-rotational axis 110-3. It will be appreciated that the predetermined angle (a) may vary. For example, the predetermined angle (a) may vary from 35-degrees to 65-degrees. In one particular embodiment, the predetermined angle (a) is 55-degrees.

Figure 15:
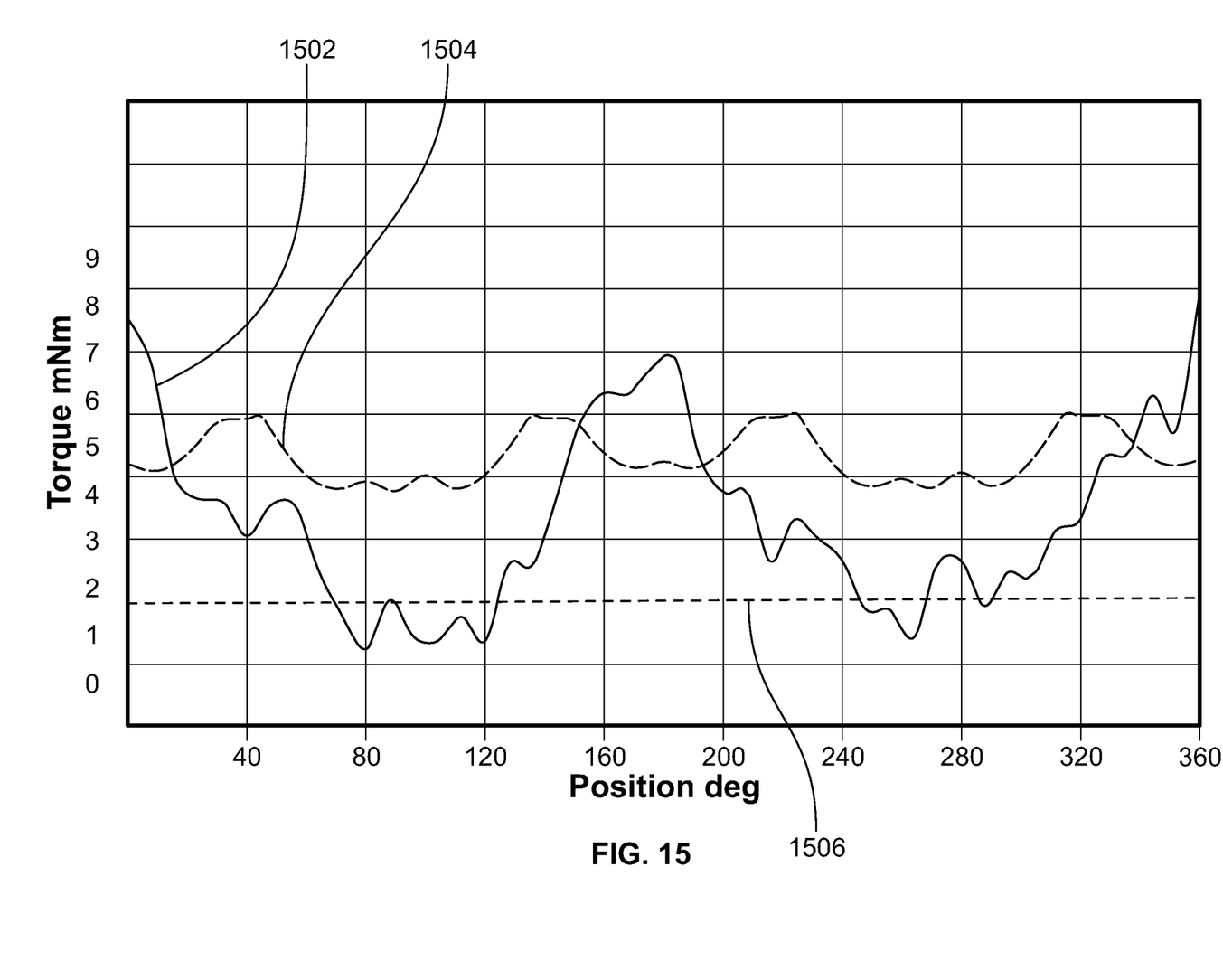
FIG. 15 graphically depicts torque vs. rotational position around a first rotational axis for two different hybrid spherical motor embodiments.

For completeness, reference should now be made to FIG. 15, which graphically depicts torque vs. rotational position around the first rotational axis 110-1 for two different embodiments of the hybrid motor 100. One curve 1502 depicts the characteristics for a first hybrid motor 100 in which the first and second stator windings 122-1, 122-2 comprise two coils. The other curve 1504 depicts the characteristics for a second hybrid motor 100 in which the first stator winding 122-1 comprises two coils, and the second stator winding 122-2 comprises four coils. The depicted graphic also includes a line 1506 that represents the assumed load torque and opposing torque. As depicted therein, while both embodiments provide improved average torque—3.9 mNm for the first hybrid motor and 4.9 mNm for the second hybrid motor—the torque ripple for the second hybrid motor is significantly less than that of the first hybrid motor—1.8 mNm as compared to 7.0 mNm.

Figure 16:
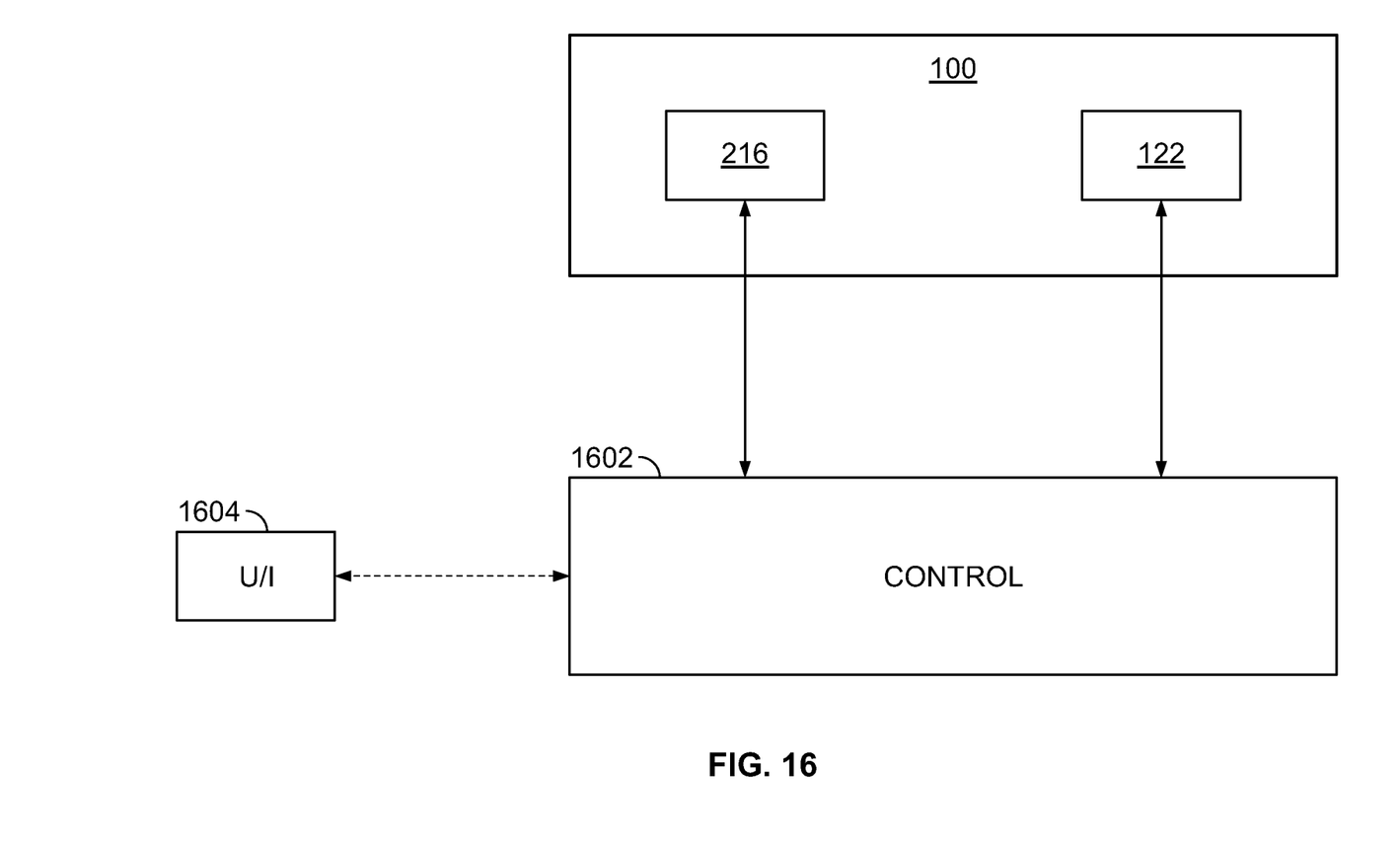
FIG. 16 depicts a functional block diagram of a hybrid spherical motor control system.

The BLDC stator 216 and the plurality of stator windings 122 are selectively and independently energized via, for example, a controller 1600, such as the one depicted in FIG. 16. The controller 1602 is coupled to the BLDC stator 216 and to the stator windings 122. The controller 1602 is configured to control the current magnitude and direction supplied to BLDC stator 216, to thereby control the direction and rotational speed of the BLDC rotor 218 about the second rotational axis 110-2 (e.g., the spin axis), and is further configured to control the current magnitude and direction supplied to the plurality of stator windings 122, to thereby control the direction and rotational speed of the split armature 112 about the first rotational axis 110-1. The controller 802 may be configured to implement any one of numerous closed-loop or open-loop control schemes.

Figure 17:
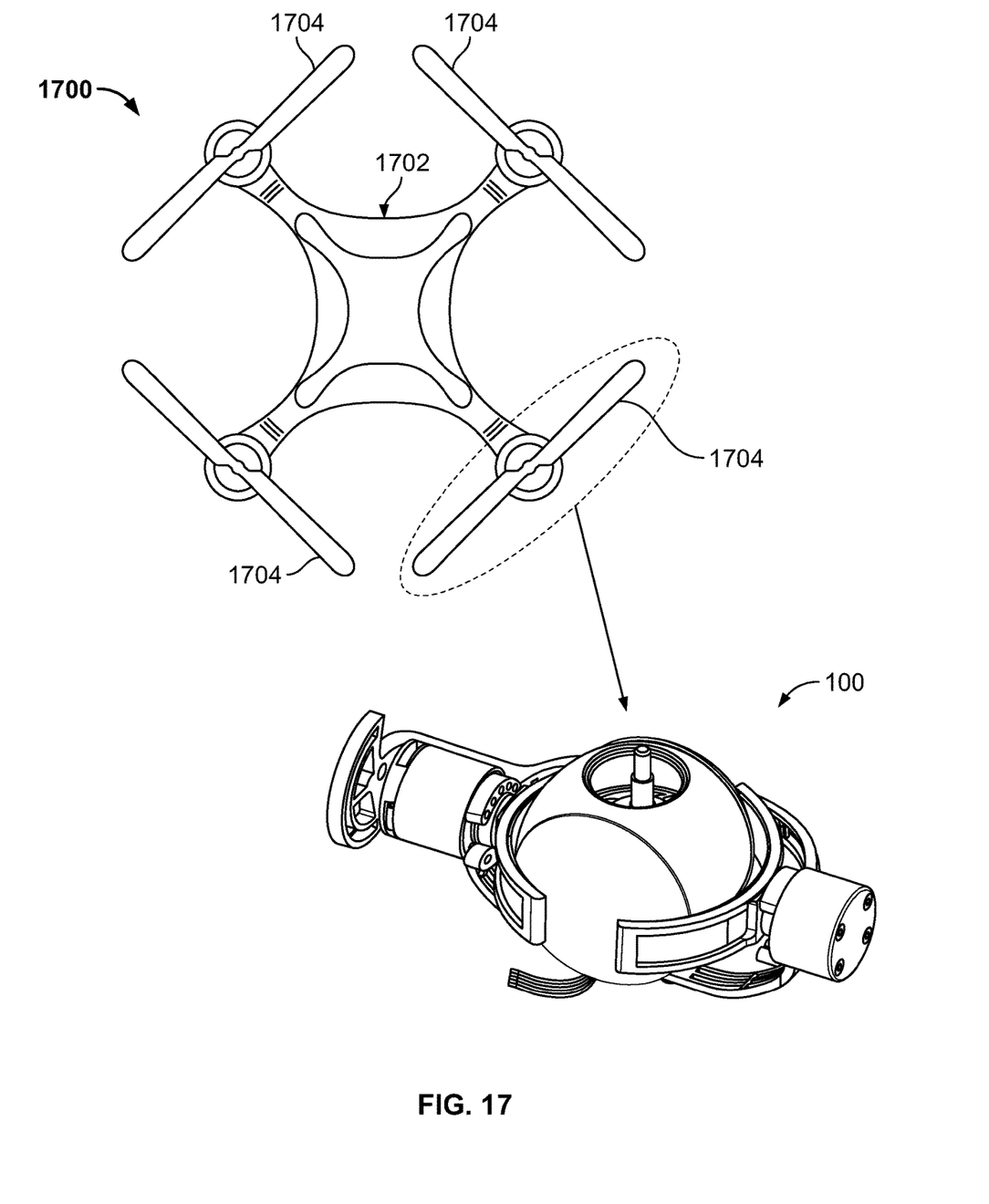
FIG. 17 depicts one embodiment of an unmanned aerial vehicle that may include the hybrid spherical motor depicted in FIG. 1.

The hybrid spherical motor 100 disclosed herein may be used in UAV, such as the UAV 1700 depicted in FIG. 17. The UAV 1700 depicted therein includes an airframe 1702, a plurality of propellers 1704, and a plurality of hybrid spherical motors 100 (only one shown). Each of propellers 1704 is mounted on, and is rotatable relative to, the airframe 1702. Each hybrid spherical motor 100 is also mounted on the airframe 1702, and each is coupled to a different one of the propellers 1704. The hybrid spherical motors 100 may be controlled via the control 1602 of FIG. 16, which may be disposed on, or separate from, the airframe 1702. If disposed separate from the airframe 1702, the control 1602 is configured to wirelessly communicate with sources of power that supply the currents to the BLDC stator 216 and plurality of stator windings 122. If the control 1602 is disposed on the airframe 1702, a separate user interface device 1604 may be used to supply commands to the control 1602, which in turn controls the currents to the BLDC stator 216 and plurality of stator windings 122.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A hybrid spherical motor, comprising:
a first gear box mounted against rotation, the first gear box including a first gear box input connection and a first gear box output connection, the first gear box input connection rotatable about a first rotational axis;
a second gear box coupled to, and spaced apart from, the first gear box, the second gear box having a second gear box input connection and a second gear box output connection, the second gear box input connection rotatable about the first rotational axis;
a yoke arm having a first end and a second end, the first end coupled to the first gear box output connection, the second end coupled to the second gear box output connection;
a brushless direct current (BLDC) motor mounted on the yoke arm, the BLDC comprising a BLDC stator and a BLDC rotor, the BLDC stator fixedly coupled to the yoke arm, the BLDC rotor rotationally coupled to the yoke arm and configured, in response to the BLDC stator being energized, to rotate about a second rotational axis that is perpendicular to the first rotational axis;
a spherical stator having a plurality of stator windings wound thereon, the spherical stator fixedly coupled to the yoke arm and surrounding at least a portion of the BLDC motor; and
a split armature spaced apart from, and surrounding a portion of, the spherical stator, the split armature including a first armature arm and a second armature arm, the first armature arm coupled to the first gear box input connection and rotatable therewith about the first rotational axis, the second armature arm coupled to the second gear box input connection and rotatable therewith about the first rotational axis,
wherein:
the split armature, in response to the plurality of stator windings being energized, rotates about the first rotational axis, thereby causing the first gear box input connection and the second gear box input connection to rotate about the first rotational axis, and
the yoke arm rotates about the first rotational axis in response to the first gear box input connection and the second gear box input connection being rotated about the first rotational axis, whereby the BLDC motor rotates about the first rotational axis.

2. The hybrid spherical motor of claim 1, wherein:
the first gear box exhibits a gear ratio between the first gear box input connection and the first gear box output connection; and
the second gear box exhibits the gear ratio between the second gear box input connection and the second gear box output connection.

3. The hybrid spherical motor of claim 1, wherein:
the plurality of stator windings comprises a first stator winding and a second stator winding; and
the first stator winding and second stator winding are configured to be independently energized.

4. The hybrid spherical motor of claim 3, wherein:
the first stator winding comprises a first coil and a second;
the second stator winding comprises a third coil, a fourth coil, a fifth coil, and a sixth coil.

5. The hybrid spherical motor of claim 4, wherein:
the first and second coils are electrically connected in series; and
the third, fourth, fifth, and sixth coils are electrically connected in series.

6. The hybrid spherical motor of claim 5, wherein:
the first and second coils are each wound symmetrically about the second rotational axis;
the third and fourth coils are each wound symmetrically about a first coil axis, the first coil axis being disposed perpendicular to the second rotational axis; and
the fifth and sixth coils are each wound symmetrically about a second coil axis, the second coil axis being disposed perpendicular to the second rotational axis.

7. The hybrid spherical motor of claim 6, wherein:
the spherical stator is symmetrically disposed about the first rotational axis, the second rotational axis, and a non-rotational axis, the non-rotational axis disposed perpendicular to the first and second rotational axis and coplanar with the first rotational axis;
the first coil axis is coplanar with the first rotational axis and the non-rotational axis, and is disposed at a predetermined angle, in a first rotational direction, from the non-rotational axis;
the second coil axis is coplanar with the first rotational axis and the non-rotational axis, and is disposed at the predetermined angle, in a second rotational direction, from the non-rotational axis; and
the first rotational direction is opposite the second rotational direction.

8. The hybrid spherical motor of claim 7, wherein the predetermined angle ($\alpha$) is 35-degrees$\leq\alpha\leq$65-degrees.

9. The hybrid spherical motor of claim 7, wherein the predetermined angle ($\alpha$) is 55-degrees.

10. The hybrid spherical motor of claim 1 wherein:
the first armature arm comprises a first arc-shaped support and a first Halbach array coupled to the first arc-shaped support; and
the second armature arm comprises a second arc-shaped support and a second Halbach array coupled to the second arc-shaped support.

11. The hybrid spherical motor of claim 10, wherein the first and second Halbach array each comprise three arc-shaped magnets having a 45-degree arc length.

12. The hybrid spherical motor of claim 1, wherein the spherical stator comprises a plastic material.

13. The hybrid spherical motor of claim 1, wherein the spherical stator comprises metal foam.

14. The hybrid spherical motor of claim 1, wherein the spherical stator is configured as a lattice structure.

15. A hybrid spherical motor system, comprising:
a first gear box mounted against rotation, the first gear box including a first gear box input connection and a first gear box output connection, the first gear box input connection rotatable about a first rotational axis and exhibiting a gear ratio between the first gear box input connection and the first gear box output connection;
a second gear box coupled to, and spaced apart from, the first gear box, the second gear box having a second gear box input connection and a second gear box output connection, the second gear box input connection rotatable about the first rotational axis and exhibiting the gear ratio between the second gearbox input connection and the second gearbox output connection;
a yoke arm having a first end and a second end, the first end coupled to the first gear box output connection, the second end coupled to the second gear box output connection;
a brushless direct current (BLDC) motor mounted on the yoke arm, the BLDC comprising a BLDC stator and a BLDC rotor, the stator fixedly coupled to the yoke arm, the BLDC rotor rotationally coupled to the yoke arm and configured, in response to the BLDC stator being energized, to rotate about a second rotational axis that is perpendicular to the first rotational axis;
a spherical stator having a plurality of stator windings wound thereon, the spherical stator fixedly coupled to the yoke arm and surrounding at least a portion of the BLDC motor;
a split armature spaced apart from, and surrounding a portion of, the spherical stator, the split armature including a first armature arm and a second armature arm, the first armature arm coupled to the first gear box input connection and rotatable therewith about the first rotational axis, the second armature arm coupled to the second gear box input connection and rotatable therewith about the first rotational axis; and
a controller coupled to, and configured to selectively and independently energize, the BLDC motor stator and the plurality of stator windings,
wherein:
the split armature, in response to the controller energizing the plurality of stator windings, rotates about the first rotational axis, thereby causing the first gear box input connection and the second gear box input connection to rotate about the first rotational axis, and
the yoke arm rotates about the first rotational axis in response to the first gear box input connection and the second gear box input connection being rotated about the first rotational axis, whereby the BLDC motor rotates about the first rotational axis.

16. The hybrid spherical motor system of claim 15, wherein:
the plurality of stator windings comprises a first stator winding and a second stator winding;
the first stator winding and second stator winding are configured to be independently energized.

17. The hybrid spherical motor system of claim 16, wherein:
the first stator winding comprises a first coil and a second electrically connected in series;
the second stator coil comprises a third coil, a fourth coil, a fifth coil, and a sixth coil electrically connected in series.

18. The hybrid spherical motor system of claim 17, wherein:
the first and second coils are each wound symmetrically about the second rotational axis;
the third and fourth coils are each wound symmetrically about a first coil axis, the first coil axis being disposed perpendicular to the second rotational axis; and
the fifth and sixth coils are each wound symmetrically about a second coil axis, the second coil axis being disposed perpendicular to the second rotational axis.

19. The hybrid spherical motor system of claim 18, wherein:
the spherical stator is symmetrically disposed about the first rotational axis, the second rotational axis, and a non-rotational axis, the non-rotational axis disposed perpendicular to the first and second rotational axis and coplanar with the first rotational axis;
the first coil axis is coplanar with the first rotational axis and the non-rotational axis, and is disposed at a predetermined angle, in a first rotational direction, from the non-rotational axis;
the second coil axis is coplanar with the first rotational axis and the non-rotational axis, and is disposed at the predetermined angle, in a second rotational direction, from the non-rotational axis; and
the first rotational direction is opposite the second rotational direction.

20. An unmanned aerial vehicle (UAV), comprising:
an airframe;
a plurality of propellers rotatable relative to the airframe; and
a plurality of hybrid spherical motors mounted on the airframe, each hybrid spherical motor coupled to a different one of the propellers, each of the hybrid spherical motors comprising:
a first gear box mounted against rotation, the first gear box including a first gear box input connection and a first gear box output connection, the first gear box input connection rotatable about a first rotational axis;
a second gear box coupled to, and spaced apart from, the first gear box, the second gear box having a second gear box input connection and a second gear box output connection, the second gear box input connection rotatable about the first rotational axis;
a yoke arm having a first end and a second end, the first end coupled to the first gear box output connection, the second end coupled to the second gear box output connection;
a brushless direct current (BLDC) motor mounted on the yoke arm, the BLDC comprising a BLDC stator and a BLDC rotor, the BLDC stator fixedly coupled to the yoke arm, the BLDC rotor coupled to one of the propellers and rotationally coupled to the yoke arm, the BLDC rotor configured, in response to the BLDC stator being energized, to rotate about a second rotational axis that is perpendicular to the first rotational axis;
a spherical stator having a plurality of stator windings wound thereon, the spherical stator fixedly coupled to the yoke arm and surrounding at least a portion of the BLDC motor; and
a split armature spaced apart from, and surrounding a portion of, the spherical stator, the split armature including a first armature arm and a second armature arm, the first armature arm coupled to the first gear box input connection and rotatable therewith about the first rotational axis, the second armature arm coupled to the second gear box input connection and rotatable therewith about the first rotational axis,
wherein:
the split armature, in response to the plurality of stator windings being energized, rotates about the first rotational axis, thereby causing the first gear box input connection and the second gear box input connection to rotate about the first rotational axis, and
the yoke arm rotates about the first rotational axis in response to the first gear box input connection and the second gear box input connection being rotated about the first rotational axis, whereby the BLDC motor rotates about the first rotational axis.

\* \* \* \* \*